United States Patent

[11] 3,622,123

[72] Inventor Andre Le Gloan
Argentan Orne, France
[21] Appl. No. 33,259
[22] Filed Apr. 30, 1970
[45] Patented Nov. 23, 1971
[73] Assignee Societe D'Etudes De Baevets Et
D'Applications Technologiquis (S.E.B.A.T.)
Paris, France
[32] Priority May 5, 1969
[33] France
[31] 6,914,274

[54] WALKIE FORKLIFT POWER TRUCK
4 Claims, 3 Drawing Figs.

[52] U.S. Cl. .................................................... 254/2 R
[51] Int. Cl. .................................................... B60p 1/00
[50] Field of Search ........................................ 254/2;
280/43 R; 214/1 D

[56] References Cited
UNITED STATES PATENTS
3,188,107 6/1965 Quayle ................... 254/2 X
3,249,170 5/1966 Quayle ................... 280/43.12
3,567,240 3/1971 Brassington ............ 254/2 B Primary Examiner—Andrew R. Juhasz
Assistant Examiner—David R. Melton
Attorney—Amster & Rothstein ABSTRACT: A walkie forklift power truck comprising a driving and steering wheel, a vertically fixed structure incorporating a swiveling support for said driving and steering wheel, a control member connected to said swiveling support, an elevating structure vertically connected to said fixed structure so that said elevating structure can be lifted in relation to said fixed structure, means coacting with said fixed and elevating structure, for lifting said elevating structure, a unit comprising a motor and a reduction gearing for driving said driving and steering wheel from said motor, wherein said motor and reduction gearing are assembled in a manner known per se to constitute a self-contained, detachable, independent, complete unit enclosed in a fluidtight casing adapted to be easily separated, with an output shaft, and wherein said output shaft is trunnioned in said swiveling support and carries the driving wheel so as to drive the latter directly, said motor and reduction gearing unit, which constitutes a floating assembly, being carried only by said wheel and held against rotation by a reaction point positioned on said swiveling support.

PATENTED NOV 23 1971 3,622,123

INVENTOR.
ANDRÉ LE GLOAN
BY
Amster & Rothstein
ATTORNEYS.

3,622,123

WALKIE FORKLIFT POWER TRUCK

BACKGROUND OF THE INVENTION

This invention relates in general to forklift power trucks and has specific reference to a "walkie" forklift truck, i.e. a power-operated vehicle driven from a control handle while walking along it, and comprising a single driving and steering wheel driven from a motor and reduction unit.

Various mountings of the forklift truck motor have already been proposed as well as different means for transmitting the torque from this motor to the driven and steered wheel, but actually none of these mountings and transmission systems has proved fully satisfactory, notably from the points of view of the protection of the motor against shocks, the overall dimensions of this motor, the protection of the transmission members against shocks and also against the risk of soiling the driver with oil, etc., not to mention the frequent considerable degree of sophistication of these transmission members.

SUMMARY OF THE INVENTION

It is the essential object of this invention to avoid these various inconveniences.

To this end, the walkie forklift power truck according to this invention, which comprises a single driving and steering wheel, a vertically fixed structure comprising a swivelling support for this wheel, an elevating structure vertically connected to said fixed structure so that the former can be lifted in relation to the latter, means coacting with said fixed and elevating structures for lifting said elevating structure, a unit comprising a motor and a reduction gearing for driving the driving and steering wheel from said motor, is characterized in that said motor and reduction gearing are assembled in a manner known per se to constitute a self-contained, detachable independent, complete unit enclosed in a fluid-tight casing adapted to be easily separated, with an output shaft, and that said output shaft is trunnioned in said swivelling support and carries the driving wheel so as to drive the latter directly, said motor and reduction gearing unit, which constitutes a floating assembly, being carried only by said wheel and held against rotation by a reaction point positioned on said swivelling support.

BRIEF DESCRIPTION OF THE DRAWING

A detailed description of a typical form of embodiment of this invention will now be given with reference to the attached drawing, in which.

DESCRIPTION OF THE PREFERRED EMBODIMENT

Figure 1:
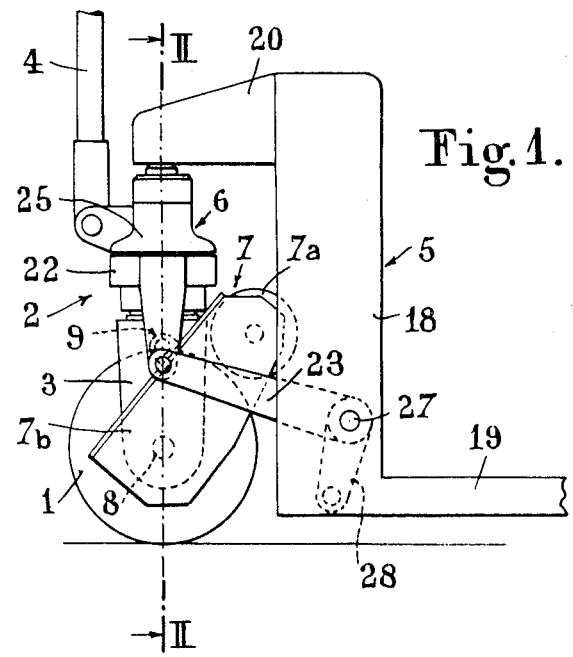
FIG. 1 is a fragmentary elevational view of the walkie forklift truck according to this invention.

The forklift truck illustrated comprises essentially a driving and steered wheel 1, a vertically fixed structure 2 with a swivelling support 3 for the driving and steering wheel 1, a control pole 4 for steering this wheel, and an elevating structure 5, power elevating means 6 and a motor and reduction gearing unit 7 for driving said wheel 1.

Figure 2:
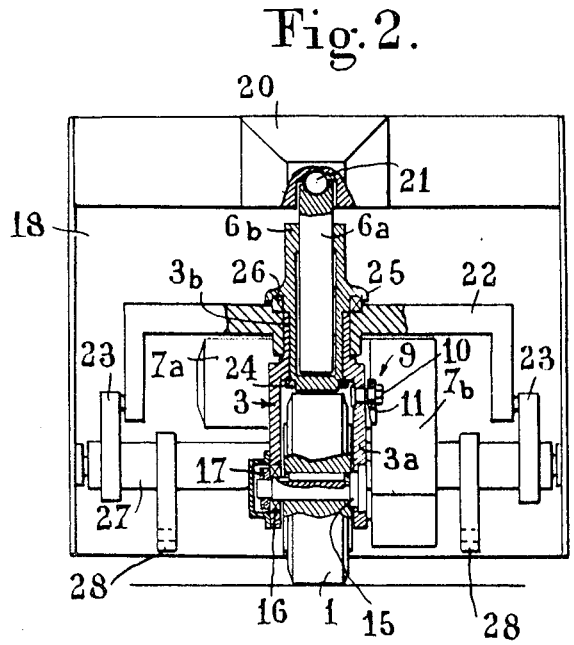
FIG. 2 is a part-sectional view, the section being taken along the line II—II of FIG. 1.

As clearly shown in FIGS. 1 and 2, the motor and reduction gearing unit 7 comprises a motor proper 7a and a reduction gearing 7b constituting a floating and fully sealed assembly. According to this invention, the output shaft 8 of this motor and reduction gearing unit 7 is trunnioned in the vertical arms of a fork constituting the swivelling support 3, and carries and drives the wheel 1; the motor and reduction gearing unit 7 is secured in a particularly simple manner to the fork 3 at a single anchorage point 9 constituting the only reaction point for receiving the motor torque.

Figure 3:
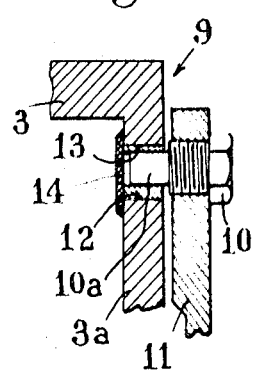
FIG. 3 is a sectional view showing a detail.

As shown in detail in FIG. 3, the anchorage point 9 may advantageously consist of a screw 10 extending firstly through a tapped lug 11 rigid with the case of the reduction gearing 7b, and the plain end 10b of this screw 10 engages a hole 12 formed through one arm 3a of fork 3 with the interposition of a cylindrical socket 13 formed with an eccentric bore. With this arrangement any differences in the position of the reaction point likely to occur between the reduction gearing 7b and the fork 3 can easily be compensated. A retainer plate 14 welded to the inner face of arm 3a of fork 3 prevents the socket 13 from emerging from the hole 12 when assembling the motor and reduction gearing unit.

The output shaft 8 keyed directly to the interior of the hub of wheel 1 and trunnioned in the arms of fork 3 by means of rolling-contact bearings 15 and 16, is locked against axial movement in relation to this fork by means of a nut 17 engaging the screw-threaded free end of said shaft and bearing against the inner race of the rolling-contact bearing 16.

The elevating structure 5 consists in a manner known per se of a vertical and transverse apron 18 from the lower end of which extend in a substantially horizontal common plane a pair of transversely spaced longitudinal forklift arms 19 bearing with their outer or free ends (not shown) against the floor through the medium of casters (not shown) vertically adjustable in relation to said arms 19. The apron 18 further comprises, in the middle of its upper portion, another substantially horizontal arm or bracket 20 extending in a direction opposite to that if said arms 19 and engaged vertically from beneath through the medium of a ball 21 by the piston rod 6a of a fluid-operated cylinder and piston actuator constituting the elevating means 6.

According to another feature characterizing this invention the fork 3 has a vertical upper extension in the form of a hollow cylinder 3b receiving in its bore the lower portion of the cylinder 6b of actuator 6 and engaged externally by a relatively thick transverse plate 22 having its ends connected by means of links 23 to the elevating structure 5. The lower portion of the cylinder 6b of actuator 6 is screw-threaded and engaged by a nut 24 for rigidly assembling the cylinder 6b and fork 3. This cylinder 6b further comprises an outflared intermediate portion 25 engaged from underneath by said plate 22 through the medium of an axial or thrust bearing 26 permitting the rotation in relation of this plate 22 of the assembly comprising the actuator 6, fork 3, wheel 1 and motor and reduction gearing unit 7 about the vertical axis of said actuator, under the control of the pole 4.

According to a complementary feature of this invention, the motor and reduction gearing unit 7 is so mounted to the fork 3 that the motor 7a lies between the vertically fixed portion 2 and the apron 18, the latter being formed to this end with a cavity opening towards the motor and reduction gearing unit in order to permit the movements of this unit when the driving and steering wheel 1 is turned.

On the other hand, the links 23 are preferably rigidly interconnected by a shaft 27 having its ends trunnioned in said apron 18. This shaft 27 also carries a pair of radial arms 28 permitting of actuating in the known manner either control rods (not shown) for vertically adjusting the casters of fork arms 19 in synchronism with the vertical movements of the elevating structure 5.

Of course, the specific form of embodiment of the invention which is described hereinabove should not be construed as limiting the scope of the invention since various modifications may be brought thereto without departing from the spirit and scope of the invention as set forth in the appended claims.

What I claim is:

1. A walkie forklift power truck comprising a driving and steering wheel, a vertically fixed structure incorporating a swivelling support for said driving and steering wheel, a control member connected to said swivelling support, an elevating structure vertically connected to said fixed structure so that said elevating structure can be lifted in relation to said fixed structure, means coacting with said fixed and elevating structure for lifting said elevating structure, a unit comprising a motor and a reduction gearing for driving said driving and steering wheel steering said motor, wherein said motor and reduction gearing are assembled in such a manner as to constitute a self-contained, detachable, independent, complete unit enclosed in a fluid-tight casing adapted to be easily separated, with an output shaft, and wherein said output shaft is trunnioned in said swivelling support an carries the driving wheel so as to drive the latter directly, said motor and reduction gearing unit, which constitutes a floating assembly, being carried only by said wheel and held against rotation by a reaction point positioned on said swivelling support.

2. A walkie forklift power truck as set forth in claim 1, wherein said swivelling support consists of a fork and said single reaction point consists of a screw having a plain end portion, said screw engaging firstly a tapped lug rigid with said motor and reduction gearing unit and, with its plain portion, through the medium of a cylindrical socket formed with an eccentric axial bore, a cylindrical hole formed in one arm of said fork, the axis of said cylindrical hole being parallel to the axis of the output shaft of said motor and reduction gearing unit.

3. A walkie forklift power truck as set forth in claim 2, wherein said elevating structure comprises a vertical transverse apron from which an upper arm extends horizontally above said vertically fixed structure, and wherein said means coacting with said fixed and elevating structures for lifting said elevating structure comprise a cylinder and piston actuator of which the piston rod bears vertically from beneath against said upper arm, said wheel-supporting swivelling fork having at its upper portion a vertical extension consisting of a hollow cylinder receiving internally the lower portion of the cylinder of said elevating actuator and externally a transverse, relatively thick plate having its ends connected through links to said apron of said elevating structure, fastening means for rigidly connecting said hollow cylinder of said fork to the lower portion of said actuator cylinder, said actuator cylinder comprising in addition a horizontal outflared intermediate portion engaged from underneath by said transverse plate through the medium of an axial thrust bearing in order to permit the rotation in relation to said transverse plate of the assembly comprising said actuator, said fork, said driving and steering wheel and said motor and reduction gearing unit about the vertical axis of said actuator, under the control of said control member, said assembly and said transverse plate constituting the vertically fixed structure of the walkie forklift power truck.

4. A walkie forklift power truck as set forth in claim 3, wherein said motor and reduction gearing unit is mounted to said fork in such a manner that the motor lies between said vertically fixed structure and said apron, the latter being formed to this end with a cavity open towards said unit to permit the movements thereof when turning said driving and steering wheel.

* * * * *